United States Patent [19]

Sorensen

[11] Patent Number: 5,174,941

[45] Date of Patent: Dec. 29, 1992

[54] INJECTION-MOLDING PRODUCT WALL-THICKNESS CONTROL METHODS

[75] Inventor: Jens O. Sorensen, Rancho Santa Fe, Calif.

[73] Assignee: Primtec, Rancho Santa Fe, Calif.

[21] Appl. No.: 892,611

[22] Filed: May 29, 1992

Related U.S. Application Data

[63] Continuation of Ser. No. 347,472, May 4, 1989, abandoned, which is a continuation-in-part of Ser. No. 201,690, Jun. 2, 1988, Pat. No. 4,867,672.

[51] Int. Cl.$^5$ .............................................. B29C 45/36
[52] U.S. Cl. ................................ 264/250; 264/328.7; 264/328.16; 425/577
[58] Field of Search ...................... 264/250, 294, 328.1, 264/328.7, 328.8, 328.12, 328.13, 328.14, 328.16; 425/542, 555, 577, DIG. 5, DIG. 129

[56] References Cited

U.S. PATENT DOCUMENTS

| | | | |
|---|---|---|---|
| 3,305,892 | 2/1967 | Heider | 264/537 |
| 3,737,272 | 6/1973 | Segmuller | 264/328.7 |
| 4,339,408 | 7/1982 | Jenkins | 264/328.7 |
| 4,508,676 | 4/1985 | Sorensen | 264/294 |
| 4,733,801 | 3/1988 | Scammell | 264/328.7 |

FOREIGN PATENT DOCUMENTS 17577 1/1972 Australia .

Primary Examiner—Jill L. Heitbrink
Attorney, Agent, or Firm—Edward W. Callan

[57] ABSTRACT

The dimensions of a plastic product are controlled while injection molding the product in a mold cavity of a mold comprising a core section and a cavity section, separated by a parting line and defining the mold cavity. In one method the mold cavity wall thicknes is controlled during an injection of a first quantity of plastic material by locking the core section to impede lateral movement thereof by means of contact between a non-perpendicular contact surface of a protracted contact element of one mold section and an associated non-perpendicular contact surface of the other mold section, and is further controlled during an injection of a second quantity of plastic material, which occurs a predetermined period after discontinuing the flow of plastic material into the mold cavity and after the contact element has been retracted, by locking the core section to impede lateral movement thereof by means of a at-least-partly-solidified wall sections having a controlled thickness formed during the injection of the first quantity of plastic material. In another method, the mold cavity wall thickness is controlled during an injection of a first quantity of plastic material, which does not completely cover the parting line of the mold, by locking the core section to impede lateral movement thereof by means of contact between a non-perpendicular contact surface of a protracted contact element of one mold section and an associated non-perpendicular contact surface of the other mold section, and is further controlled during an injection of a second quantity of plastic material, which occurs after the contact element has been retracted, by locking the core section to impede lateral movement thereof by means of at-least-partly-solidified wall sections having a controlled thickness formed during the injection of the first quantity of plastic material.

2 Claims, 4 Drawing Sheets

INJECTION-MOLDING PRODUCT WALL-THICKNESS CONTROL METHODS

CROSS REFERENCE TO RELATED APPLICATION

This is a continuation of co-pending application Ser. No. 07/347,472 filed on May 4, 1989 now abandoned, which is a continuation-in-part of application Ser. No. 07/201,690 filed Jun. 2, 1988 now U.S. Pat. No. 4,867,672.

BACKGROUND OF THE INVENTION

The present invention generally pertains to injection molding of plastic products and is particularly directed to improvement in methods of controlling the wall thickness of a plastic product while injection molding the product in a mold cavity of a mold comprising a core section and a cavity section, separated by a parting line and defining the mold cavity.

Prior art methods for controlling the wall thickness of injection molded plastic products are described in U.S. Pat. No. 4,508,676 to Sorensen, U.S. Pat. No. 3,737,272 to Segmuller, U.S. Pat. No. 3,305,892 to Heider, U.S. Pat. No. 4,128,381 to Bonis, Australian Patent Specification No. 17,577/70 (Ryles), and French Patent No. 962,726 to Mazzoni.

SUMMARY OF THE INVENTION

The present invention provides an injection molding method, in which the mold cavity dimensions are controlled during an injection of a first quantity of plastic material by locking the core section to impede lateral movement thereof by means of contact between a non-perpendicular contact surface of a protracted contact element of one mold section and an associated non-perpendicular contact surface of the other mold section, and is further controlled during an injection of a second quantity of plastic material, which occurs a predetermined period after discontinuing the flow of plastic material into the mold cavity and after the contact element has been retracted, by locking the core section to impede lateral movement thereof by means of at-least-partly-solidified wall sections having a controlled thickness formed during the injection of the first quantity of plastic material.

The method of the present invention includes the steps of (a) forming a mold cavity having a longitudinal axis by combining the core section with the cavity section, wherein at least one section includes a longitudinally protractable and retractable contact element, with the end of the contact element that faces the mold cavity including a contact surface;

(b) protracting the contact element to a forward position so that the contact surface of the contact element contacts an associated contact surface of the other mold section;

(c) injecting a first quantity of plastic material to cause said first quantity of plastic material to flow into the mold cavity while the contact element is in the forward position to form at least one first-plastic-material wall section of the product;

(d) cooling the injected first quantity of plastic material in the mold cavity while discontinuing the flow of plastic material into the mold cavity for a predetermined period;

(e) retracting the contact element to a rear position where the contact surface of the contact element ceases to contact the associated contact surface of the other mold section;

(f) injecting a second quantity of plastic material into the mold cavity after the injected first quantity of plastic material has at least partly solidified and while the contact element is in the rear position, wherein any lateral movement of the core section in relation to the cavity section that might be caused by injection of the second quantity of plastic material is impeded by the at-least-partly-solidified first-plastic-material wall section;

wherein step (d) includes the step of (g) at least partly solidifying the first-plastic material wall section having a controlled thickness to impede lateral movement of the core section in relation to the cavity section; and wherein step (f) includes the step of (h) injecting a second quantity of plastic material into the mold cavity while movement of the core section in relation to the cavity section is impeded by the at-least-partly-solidified first-plastic material wall section having a controlled thickness; and wherein step (a) comprises the step of (i) forming the mold cavity with a core section that includes said contact element, and with the mold sections that define a gate, an end region adjacent the gate, and a side region adjacent the end region, wherein the side region has a negative slope so that when the contact element is retracted to the rear position during step (e) the first-plastic-material wall section formed during step (c) is compressed.

Additional features of the present invention are described in relation to the description of the preferred embodiments.

DESCRIPTION OF THE PREFERRED EMBODIMENT

Figure 1:
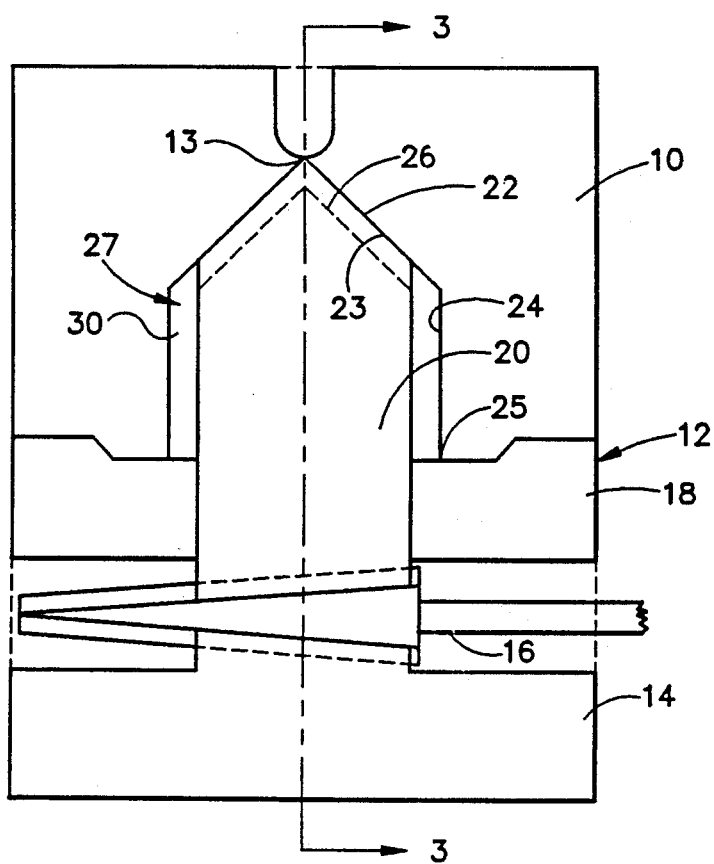
FIG. 1 is a sectional view of one system for performing certain preferred embodiments of the method of the present invention, with the contact element in a protracted position.

Referring to FIGS. 1-6, a system for performing certain preferred embodiments of the method of the present invention includes a cavity section 10, a core section 12, a gate 13, a stationary base member 14, a slidable wedge-shaped member 17 and spacing bars 17.

The core section 12 includes a mating element 18 and a protractable and retractable ram-shaped contact element 20. The end of the contact element 20 that faces the cavity section 10 has a contact surface 22. The cavity section 10 has an associated contact surface 23, which coincides with the contact surface 22 of the contact element 20.

The cavity section 10 and the core section 12 are combined to define a mold cavity 24. When combined, the cavity section 10 and the core section 12 have a parting line 25 therebetween.

The mating element 18 and the stationary base member 14 are maintained in a fixed position in relation to each other by the spacing bars 17.

Figure 3:
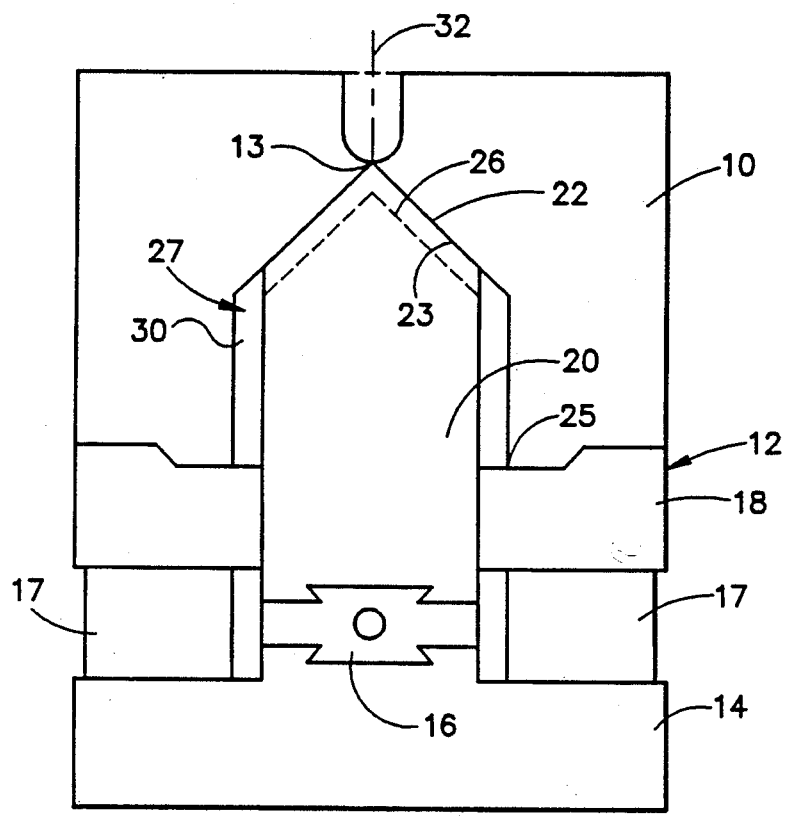
FIG. 3 is a sectional view of the system of FIGS. 1 and 2 taken along line 3—3 in FIG. 1.

The wedge-shaped member 16 has a dove-tail-shaped lateral cross section, as shown in FIG. 3; and the contact element 20 and the stationary base member 14 have corresponding dove-tail-shaped slots for receiving the wedge-shaped member 16 so that the wedge-shaped member 16 is slidably and retentatively coupled to both the contact element 20 and the stationary base member 14. Accordingly, protraction of the wedge-shaped member 16 causes the contact element 20 to be protracted to a forward position; and retraction of the wedge-shaped member 16 causes the contact element 20 to be retracted to a rear position.

Figure 4:
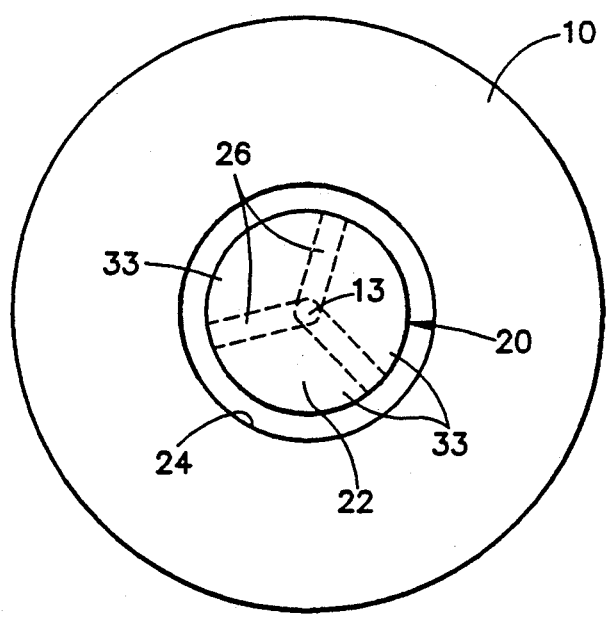
FIG. 4 is a sectional view of the system of FIGS. 1 and 2 taken along line 4—4 in FIG. 2.

At least part of the contact surface 22 of the contact element 20 is non-perpendicular to the longitudinal axis 32 of the cavity section 10. At least part of the associated contact surface 23 of the cavity section 10 also is non-perpendicular to the longitudinal axis 32 of the cavity section 10. Referring to FIG. 4, the contact surface 22 of the contact element 20 has a generally conical shape and includes a plurality of flow channels 26, which extend radially from the apex of the cone. Each contact surface may include several disconnected portions, such as the separate portions 33 shown in FIG. 4.

The contact element 20 forms the entire mold-cavity-defining portion of the core section 12.

Referring to FIGS. 1–4, the mold cavity 24 defines a hollow, plastic product 27, having a generally conical end wall 28 and a cylindrical or approximately cylindrical side-wall 30. The longitudinal axis 32 of cavity section 10 is also the axis of the cylindrical or approximately cylindrical side-wall defining portion of the mold cavity 24, and is the same as the mold opening direction.

The system illustrated in FIGS. 1–4 is used to perform certain preferred embodiments of the methods of the present invention in the following manner.

Figure 2:
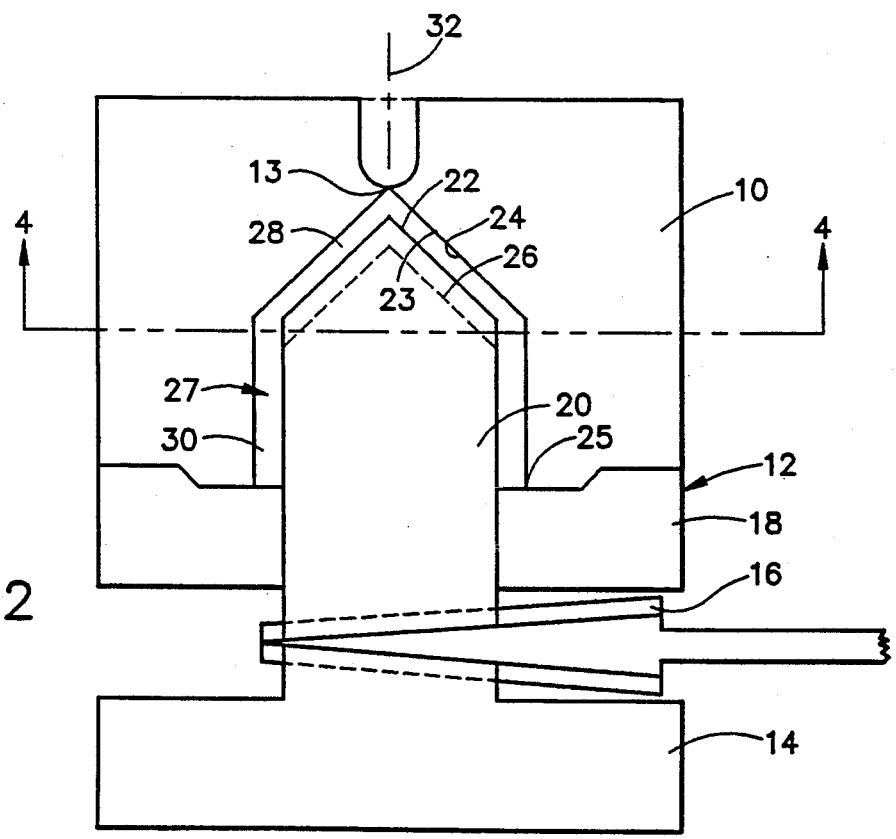
FIG. 2 is a sectional view of the system of FIG. 1, with the contact element in a retracted position.

Referring to FIG. 2, the mold cavity 24 is formed by combining the core section 12 with the cavity section 10. The core section 12 forms the inside surface of the product 27 defined by the mold cavity 24 and the cavity section 10 forms the outside surface of the product.

The slidable wedge-shaped member 16 is protracted between the contact element 20 and the stationary base member 14 to forcefully protract the contact element 20 along the longitudinal axis of the cavity section 10 to a forward position so that the non-perpendicular portion of the contact surface 22 of the contact element 20 contacts the coincident non-perpendicular portion of the associated contact surface 23 of the cavity section 10. Such contact is effected between the fringe region of the contact element contact surface 22 and the fringe region of the associated contact surface 23. The fringe region of the contact surface 22, 23 is the portion thereof that borders the side-wall-defining portion of the respective contact element 22 or cavity section 10.

In an alternative preferred embodiment (not shown) the cavity section includes a protractable and retractable contact element.

Whether the contact element is included in the core section as shown in FIGS. 1 and 2 or the cavity section (not shown) it may or may not be protractable along a longitudinal axis of the cavity section, as shown in FIGS. 1 and 2.

Protracting the contact element 20 to a forward position causes the non-perpendicular portion of the contact surface 22 to contact and be locked by the non-perpendicular portion of the associated contact surface 23 of the cavity section 10 to thereby impede lateral movement of the core section 10 in relation to the longitudinal axis 32 of the cavity section 10.

Figure 5:
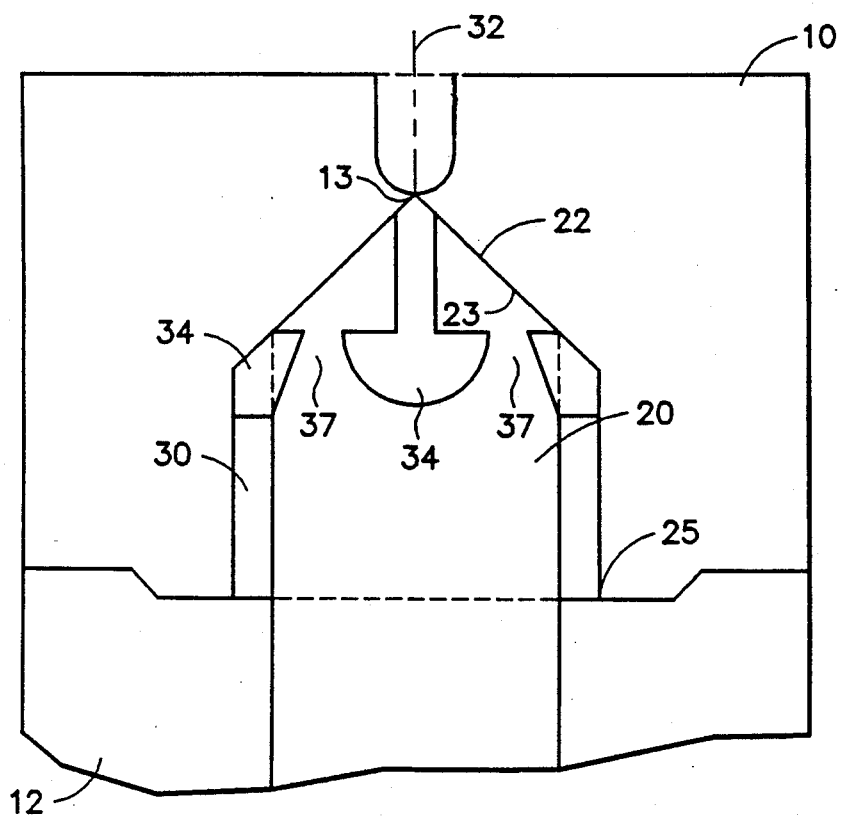
FIG. 5 is view of the mold cavity in the system of FIGS. 1-4 with the injected first quantity of plastic material not covering the parting line of the mold.
Figure 6:
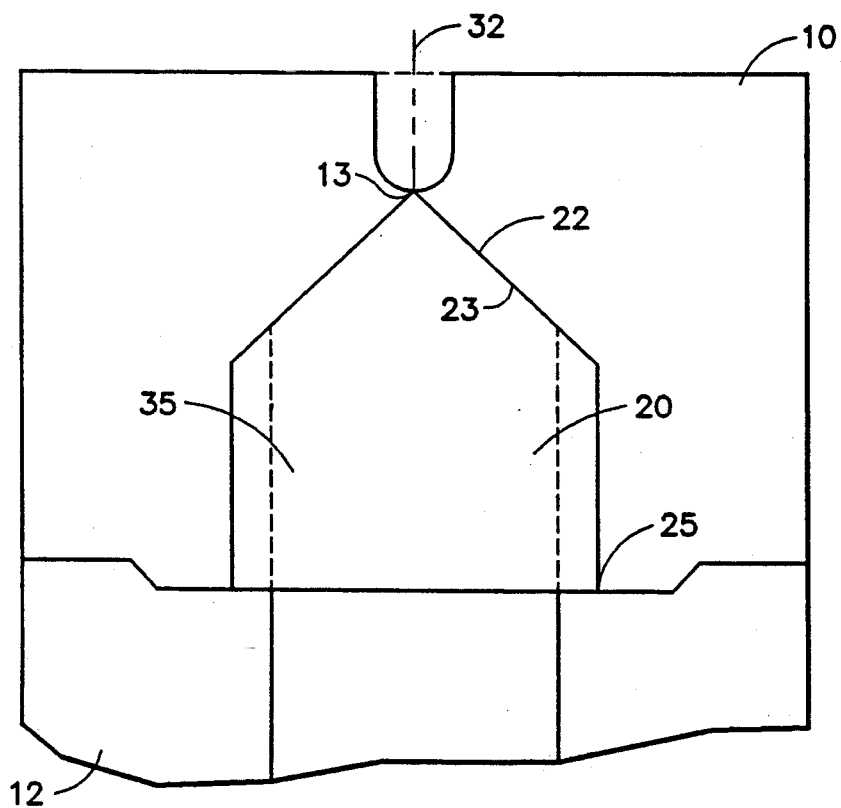
FIG. 6 is view of the mold cavity in the system of FIGS. 1-4 with the injected first quantity of plastic material covering the parting line of the mold.

A first quantity of plastic material is injected through the gate 13 and caused to flow into the mold cavity 24 and through the flow channels 26 in the contact surface 22 of the contact element 20 while the contact element is held in the forward position by the wedge-shaped member 16 to form at least one first-plastic-material section 34, 35 of the product 27. In one embodiment the injected first quantity of plastic material 34 does not completely cover the parting line 25, as shown in FIG. 5. In an alternative embodiment, the injected first quantity of plastic material 35 completely covers the parting line 25, as shown in FIG. 6.

The wall thickness of the mold cavity 24 is controlled during injection of the first quantity of plastic material because lateral movement of the core section 12 in relation to the cavity section 10 is impeded by the non-perpendicular portion of the contact surface 22 of the contact element 20 contacting and locking the coincident non-perpendicular portion of the associated contact surface 23 of the cavity section 10, as described above. Effecting such locking contact between the fringe regions of the contact element contact surface 22 and the fringe region of the associated contact surface 23 spreads such contact over a more far-reaching area and thereby better impedes any such lateral movement.

In one preferred embodiment, the injected first quantity of plastic material 34, 35 cools in the mold cavity 24 while flow of plastic material is discontinued for a predetermined period.

The slidable wedge-shaped member 16 is then retracted to cause the contact element 20 to be retracted to a rear position, as shown in FIG. 2, where the contact surface 22 ceases to contact the cavity section 10; while the injected first quantity of plastic material 34, 35 at least partly solidifies.

The at-least-partly-solidified plastic material wall section(s) 34, 35 have a controlled wall thickness as a result of the lateral movement of the core section 12 being impeded by the locking contact of the non-perpendicular wall surfaces 22, 23 during the injection of the first quantity of plastic material 34, 35.

A second quantity of plastic material is injected into the mold cavity 24 while the contact element 20 is held in the rear position by the wedge-shaped member 16 to form the remainder of the plastic product 27. In the embodiment of FIG. 5, the injected second quantity of plastic material flows to the parting line 25 to complete the formation of the side wall 30 of the plastic product 27 and also forms the end-wall 28 of the plastic product 27. In this embodiment, the at-least-partly-solidified plastic material wall section(s) 34 define flow channels 37 for directing the injected second quantity of plastic material into the remainder of the mold cavity 24. In the embodiment of FIG. 6, the injected second quantity of plastic material forms the end-wall 28 of the plastic product 27.

The at-least-partly-solidified plastic material wall section(s) 34, 35 impede any lateral movement of the core section 12 in relation to the longitudinal axis 32 of the cavity section 10 while the second quantity of plastic material is being injected, and thus control the wall thickness of the mold cavity 24 during the injection of the second quantity of plastic material into the mold cavity 24.

Because lateral movement of the core section 12 is thus impeded during injection of the second quantity of plastic material, the second quantity of plastic material may be injected at the same or a higher pressure than the pressure at which the first quantity of plastic material was injected. In the embodiment of FIG. 5, in which the injected first quantity of plastic material does not completely cover the parting line 25, the second quantity of plastic material typically is injected at a higher pressure. In the embodiment of FIG. 6, in which the injected first quantity of plastic material completely covers the parting line 25, the second quantity of plastic material is injected at a higher pressure, at the same pressure or at a lower pressure in relation to the pressure at which the first plastic material was injected. Injecting the second quantity of plastic material at a higher pressure enhances bonding between the first and second quantities of plastic material.

The contact element 20 may be protracted to hold pressurize the injected plastic material.

This completes formation of the plastic product 27 having a controlled wall thickness in accordance with the above-described embodiments of the present invention. After the product 27 is solidified, the mold is opened and the product 27 is ejected. The above-described cycle is then repeated.

In an alternative preferred embodiment, the steps of the method are the same as described above, except that flow of the plastic material in the mold cavity is not interrupted between the injection of the first quantity of plastic material and the injection of the second quantity of plastic material. In this alternative embodiment, however, the first quantity of plastic material does not flow to completely cover the parting line. Such limited flow of the first quantity of plastic material is shown in FIG. 5, wherein the first quantity of plastic material at least partly solidifies to form the wall sections 34.

Figure 7:
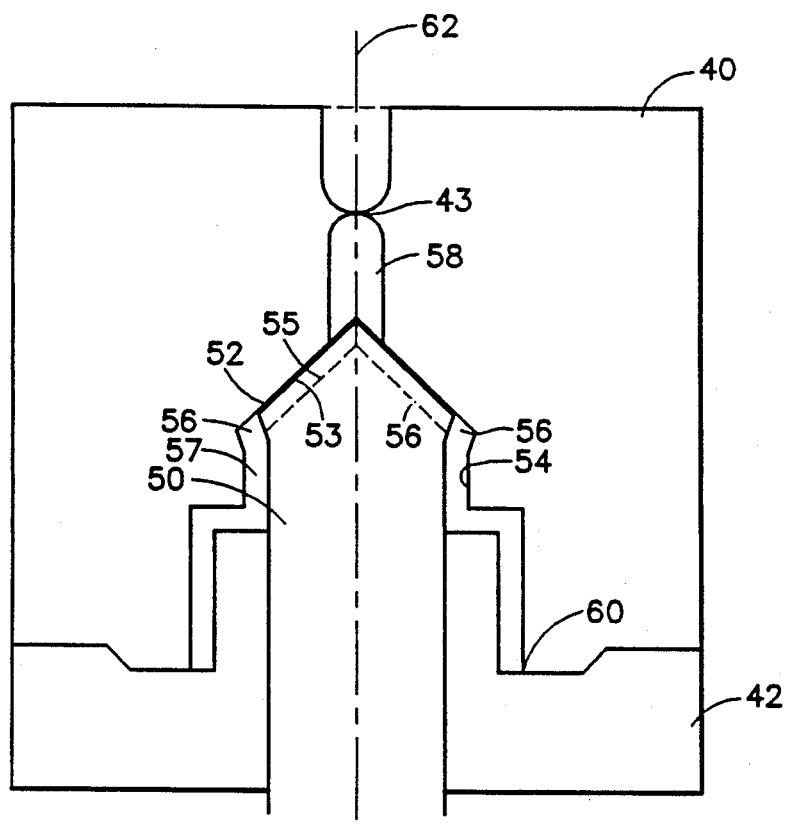
FIG. 7 is a sectional view of an alternative system for performing certain preferred embodiments of the method of the present invention, with the contact element in a protracted position.
Figure 8:
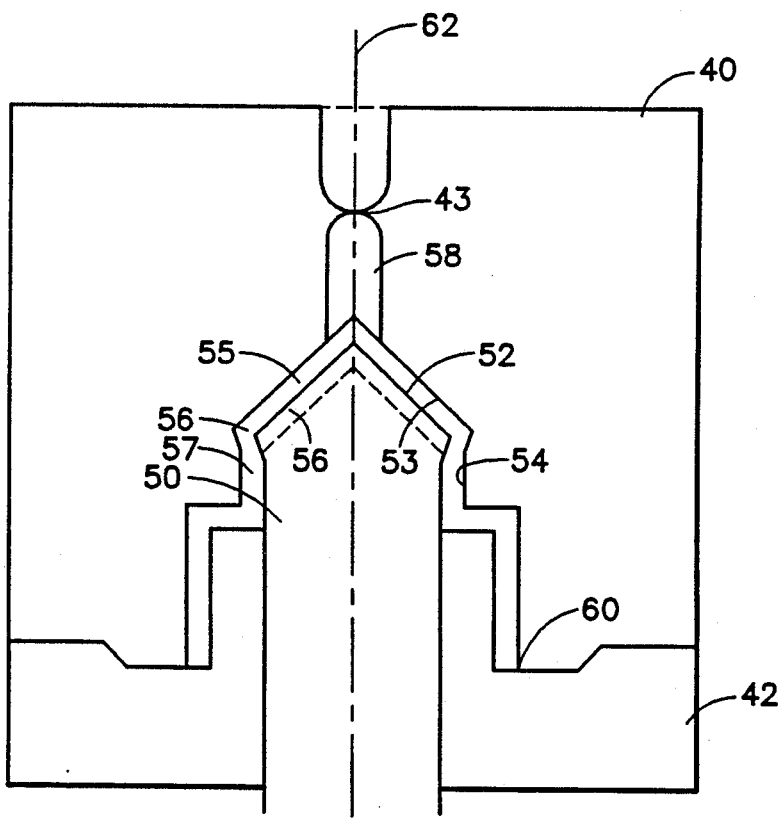
FIG. 8 is a sectional view of the system of FIG. 7, with the contact element in a retracted position.

Additional preferred embodiments of the method of the invention are practised by using the system of FIGS. 7 and 8. The system of FIGS. 7 and 8 includes a cavity section 40, a core section 42, and a gate 43. The core section 42 includes a protractable and retractable ram-shaped contact element 50. The end of the contact element 50 that faces the cavity section 40 has a contact surface 52. The cavity section 40 has an associated contact surface 53, which coincides with the contact surface 52 of the contact element 50.

The cavity section 40 and the core section 42 are combined to define a mold cavity 54. When combined, the cavity section 40 and the core section 42 have a parting line 60 therebetween.

At least part of the contact surface 52 of the contact element 50 is non-perpendicular to the longitudinal axis 62 of the cavity section 40. At least part of the associated contact surface 53 of the cavity section 40 also is non-perpendicular to the longitudinal axis 62 of the cavity section 40. The contact surface 52 of the contact element 50 has a generally conical shape and includes a plurality of flow channels 56, which extend radially from the apex of the cone. Each contact surface may include several disconnected portions.

The mold cavity 54 further defines an end region 55, a side region 56 adjacent the end region 55 and a cylindrical or approximately cylindrical side-wall-defining region 57 adjacent the side region 56. The side region 56 has a negative slope. In addition, the mold cavity 54 defines a flow region 58 between the gate 43 and the end region 55.

The longitudinal axis 62 of cavity section 40 is also the axis of the cylindrical or approximately cylindrical side-wall defining portion of the mold cavity 54, and is the same as the mold opening direction.

The system illustrated in FIGS. 7 and 8 is used to perform certain preferred embodiments of the methods of the present invention in the following manner.

The mold cavity 54 is formed by combining the core section 42 with the cavity section 40. The core section 42 forms the inside surface of the product defined by the mold cavity 54 and the cavity section 40 forms the outside surface of the product.

The contact element 50 is protracted by means such as the wedge-shaped member 16 of the embodiment of FIGS. 1-6 along the longitudinal axis 62 of the cavity section 50 to a forward position so that the non-perpendicular portion of the contact surface 52 of the contact element 50 contacts the coincident non-perpendicular portion of the associated contact surface 53 of the cavity section 40. Such contact is effected between the fringe region of the contact element contact surface 52 and the the fringe region of the associated contact surface 53. The fringe region of the contact surface 52, 53 is the portion thereof that borders the side-wall-defining portion of the respective contact element 52 or cavity section 40.

Protracting the contact element 50 to a forward position causes the non-perpendicular portion of the contact surface 52 to contact and be locked by the non-perpendicular portion of the associated contact surface 53 of the cavity section 40 to thereby impede lateral movement of the core section 40 in relation to the longitudinal axis 62 of the cavity section 40.

A first quantity of plastic material is injected through the gate 43 and caused to flow into the mold cavity 54 through the flow region 58 and through the flow channels 56 in the contact surface 52 of the contact element 50 to completely cover the parting line 60 while the contact element 50 is held in the forward position to form at least one first-plastic-material section of the product.

The wall thickness of the mold cavity 54 is controlled during injection of the first quantity of plastic material because lateral movement of the core section 42 in relation to the cavity section 40 is impeded by the non-perpendicular portion of the contact surface 52 of the contact element 50 contacting and locking the coincident non-perpendicular portion of the associated contact surface 53 of the cavity section 40, as described above. Effecting such locking contact between the fringe regions of the contact element contact surface 52 and the fringe region of the associated contact surface 53 spreads such contact over a more far-reaching area and thereby better impedes any such lateral movement.

The injected first quantity of plastic material cools in the mold cavity 54 while flow of plastic material is discontinued for a predetermined period.

The contact element 20 is then retracted to a rear position, as shown in FIG. 8, where the contact surface 52 ceases to contact the cavity section 40; while the injected first quantity of plastic material at least partly solidifies.

The at-least-partly-solidified plastic material wall section(s) have a controlled wall thickness as a result of the lateral movement of the core section 42 being impeded by the locking contact of the non-perpendicular wall surfaces 52, 53 during the injection of the first quantity of plastic material.

Because the side region 56 has a negative slope, the first-plastic-material wall section(s) are compressed when the contact element 50 is retracted to the rear position, and thereby seals the mold cavity 54 in the side region 56 to prevent the flow of subsequently injected plastic material beyond the side region 56.

A second quantity of plastic material is subsequently injected into the mold cavity 54 while the contact element 50 is held in the rear position. The injected second quantity of plastic material forms the end-wall of the plastic product.

The flow region 58 is of such dimension and/or temperature that some of the first quantity of plastic material residing in the flow region 58 while the first quantity of plastic material is cooling does not solidify during the predetermined period that flow of plastic material into the mold cavity 54 is interrupted, and is forced further into the mold cavity 54 by the subsequently injected second quantity of plastic material. Such a flow region may also be used in embodiments of the invention wherein the injected first quantity of plastic material does not completely cover the parting line, such as the embodiment described above with reference to FIGS. 1–5.

The at-least-partly-solidified plastic material wall section(s) formed by the first quantity of plastic material impede any lateral movement of the core section 42 in relation to the longitudinal axis 62 of the cavity section 40 while the second quantity of plastic material is being injected, and thus control the wall thickness of the mold cavity 54 during the injection of the second quantity of plastic material into the mold cavity 54.

Because lateral movement of the core section 42 is thus impeded during injection of the second quantity of plastic material, the second quantity of plastic material is injected at a higher pressure, at the same pressure or at a lower pressure in relation to the pressure at which the first plastic material was injected. Injecting the the second quantity of plastic material at a higher pressure enhances bonding between the first and second quantities of plastic material This completes formation of the plastic product having a controlled wall thickness in accordance with the embodiments of the present invention described with reference to FIGS. 7 and 8. After the product is solidified, the mold is opened and the product is ejected. The above-described cycle is then repeated.

In practising the various embodiments of the methods of the invention described herein, there may be injections of plastic material in addition to those so described; and such additional injections may take place, before, after and/or between the respective injections of first and second plastic materials described herein, such as for example, during the production of laminated products. Also, the second quantity of plastic material may be of a different composition and/or color than the first quantity of plastic material, and may be injected into the mold cavity by a different gate (or gates) than that used to inject the first quantity of plastic material.

I claim:

1. A method of controlling the wall thickness of a plastic product while injection molding the product in a mold cavity of a mold comprising a core section and a cavity section, separated by a parting line and defining the mold cavity therebetween, the method comprising the steps of
(a) forming a mold cavity having a longitudinal axis by combining the core section with the cavity section, wherein at least one section includes a longitudinally protractable and retractable contact element, with the end of the contact element that faces the mold cavity including a contact surface;
(b) protracting the contact element to a forward position so that the contact surface of the contact element contacts an associated contact surface of the other mold section;
(c) injecting a first quantity of plastic material to cause said first quantity of plastic material to flow into the mold cavity while the contact element is in the forward position to form at least one first-plastic-material wall section of the product;
(d) cooling the injected first quantity of plastic material in the mold cavity while discontinuing the flow of plastic material into the mold cavity for a predetermined period;
(e) retracting the contact element to a rear position where the contact surface of the contact element ceases to contact the associated contact surface of the other mold section;
(f) injecting a second quantity of plastic material into the mold cavity after the injected first quantity of plastic material has at least partly solidified and while the contact element is in the rear position, wherein any lateral movement of the core section in relation to the cavity section that might be caused by injection of the second quantity of plastic material is impeded by the at-least-partly-solidified first-plastic-material wall section;
wherein step (d) comprises the step of
(g) at least partly solidifying the first-plastic-material wall section having a controlled thickness to impede lateral movement of the core section in relation to the cavity section;
wherein step (f) comprises the step of
(h) injecting a second quantity of plastic material into the mold cavity while movement of the core section in relation to the cavity section is impeded by the at-least-partly-solidified wall section having a controlled thickness; and
wherein step (a) comprises the step of
(i) forming the mold cavity with a core section that includes said contact element, and with the mold sections that define a gate, an end region adjacent the gate, and a side region adjacent the end region, wherein the side region has a negative slope so that when the contact element is retracted to the rear position during step (e) the first-plastic-material wall section formed during step (c) is compressed.

2. A method according to claim 1, wherein step (c) comprises the step of
(j) injecting the first quantity of plastic material into the mold cavity while the contact element is in the forward position so that the injected first plastic material completely covers the parting line.

* * * * *